(12) United States Patent
Martin et al.

(10) Patent No.: US 6,409,272 B1
(45) Date of Patent: Jun. 25, 2002

(54) CHILD SAFETY RESTRAINT

(75) Inventors: Lauree Martin, Iola; Anne Christian, Garland, both of TX (US)

(73) Assignee: Propedia, L.L.C., Iola, TX (US)

( * ) Notice: Subject to any disclaimer, the term of this patent is extended or adjusted under 35 U.S.C. 154(b) by 0 days.

(21) Appl. No.: 09/621,278

(22) Filed: Jul. 20, 2000

(51) Int. Cl.[7] .............................................. A47D 15/00
(52) U.S. Cl. .................... 297/484; 297/467; 297/256.17
(58) Field of Search .............................. 297/250.1, 467, 297/484, 256.15, 256.17

(56) References Cited

U.S. PATENT DOCUMENTS 3,709,558 A * 1/1973 Jakob
4,164,357 A * 8/1979 Conachey
5,580,126 A * 12/1996 Sedlack
6,189,970 B1 * 2/2001 Rosko
6,254,184 B1 * 7/2001 Kontos \* cited by examiner Primary Examiner—Milton Nelson, Jr.
(74) Attorney, Agent, or Firm—Howrey Simon Arnold & White, LLP

(57) ABSTRACT

An apparatus suitable for safely restraining a child in a sitting position in a child transport or seat is disclosed. The apparatus may preferably be attached to a vehicular seat, infant carrier, stroller, high chair, booster seat, motion toy, or shopping cart.

25 Claims, 2 Drawing Sheets

CHILD SAFETY RESTRAINT

FIELD OF THE INVENTION

The present invention relates to a child safety restraint apparatus. More specifically, an apparatus suitable for safely restraining a child in a sitting position in a child transport is disclosed. The apparatus may preferably be attached to a shopping cart to safely restrain a child seated therein.

BACKGROUND OF THE INVENTION

Numerous systems have been developed to safely restrain children in variety of transports, including child seats, strollers and shopping carts. However, accidents continue to be a problem. Active children, if not properly supervised, are often able to defeat many of the current restraint systems. Such lack of supervision commonly occurs as parents are momentarily distracted or otherwise inattentive. Unfortunately, serious injuries are often sustained after the child escapes from the mechanical restraints.

This is particularly a problem during shopping trips. Parents often leave children temporarily unattended in a shopping cart while browsing through a store's merchandise. During these moments, accidents and injuries are likely. The magnitude of this problem was highlighted in a report from the U.S. Consumer Product Safety Commission. The Commission reported that an annual average of 21,600 children under the age of 5 were treated in U.S. hospital emergency rooms for shopping cart injuries during the years 1985 to 1996 (see http://www.cpsc/gov/library/shopcart.htmo). More than half of these were treated for falls from the carts (about 16,000 in 1996).

This danger is further compounded by additional risks. For example, a child in a cart is seated more than four feet above the ground, a relatively high position for a small child. Furthermore, the floors of many stores are made of hard tile or thin carpet over a cement base. To make matters worse, children are prone to falling head first as they attempt to escape from a shopping cart. Thus, an accident is likely to result in serious injury to the child. In fact, the Safety Commission reported that 66 percent of the fall victims were treated for head injuries (about 11,000 per year). Of these head injury cases, 54 percent of the victims suffered severe injuries such as concussions and fractures.

Such safety studies have led many pediatricians to demand better restraint systems. Some researchers have even suggested banning the transport of children in shopping carts, until safer designs are implemented. (See "*Add Shopping Carts to the List of life's Hazards*," by Denise Mann, Medical Tribune News Service, Mar. 7, 1996).

However, despite these sobering statistics and continual warnings from medical authorities, many stores continue to employ a simple waist-belt type restraint on their shopping carts. Such simple restraint systems are all too easily defeated by a determined child, even in the presence of adult supervision. Consequently, needless accidents still occur due to the lack of adequate restraint devices.

Clearly, there exists a need for safer designs of child restraint systems that provide more adequate restraint.

SUMMARY OF THE INVENTION

This invention relates to a child safety restraint apparatus. The child restraint apparatus preferably is adapted to substantially restrain a child in a sitting position when connected to a child transport or seat. Suitable child transports and seats include, but are not limited to, vehicular seats, strollers, shopping carts, chairs, highchairs, and motion toys.

The apparatus preferably comprises a plurality of adjustable and interconnecting straps positioned to restrain a child in a sitting position. In a preferred embodiment, the apparatus comprises:

a first strap having a first and second end;

a second strap having a first and second end;

a first pivot capable of being secured to a child transport between the upper legs of a child seated therein;

wherein:
the first end of the first strap and the first end of the second strap are securely connected to the first pivot; and
the second end of the first strap and the second end of the second strap are each adjustably connected to a fastener;

a third strap having a first and second end;

a fourth strap having a first and second end;

a second pivot capable of being secured to a child transport behind a child seated therein;

wherein:
the first end of the third strap and the first end of the fourth strap are securely connected to the second pivot;
the second end of the third strap and the second end of the fourth strap are each adjustably connected to a fastener;
the adjustably connected fastener on the third strap is detachably connected with the adjustably connected fastener on the first strap, such that the third strap and the first strap pass over the shoulder region of a child restrained therein; and
the adjustably connected fastener on the fourth strap is detachably connected with the adjustably connected fastener on the second strap, such that the fourth strap and the second strap pass over the shoulder region of a child restrained therein;

a fifth strap having a first and second end;

a sixth strap having a first and second end;

wherein:
the first end of the fifth strap is fixably connected to the first strap and the first end of the sixth strap is fixably connected to the second strap;
the second end of the fifth strap and the second end of the sixth strap are each adjustably connected to a fastener;
the adjustably connected fastener on the fifth strap is detachably connected with the adjustably connected fastener on the sixth strap; and
the fifth strap and sixth strap, when connected to one another, are transversely positioned between the first strap and the second strap, across the back of an child restrained therein;

a seventh strap slidably connected to the first and second strap;

wherein the seventh strap is positioned transversely between the first and second straps across the chest region of an child restrained therein.

DESCRIPTION OF THE FIGURES

The following figures form part of the present specification and are included to further demonstrate certain aspects of the present invention. The invention may be better understood by reference to one or more of these drawings in combination with the description specific embodiments presented herein.

DETAILED DESCRIPTION OF THE INVENTION

The following description demonstrates preferred embodiments of the invention. It should be appreciated by those of skill in the art that the apparatus and methods of its use have been discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

Figure 1A:
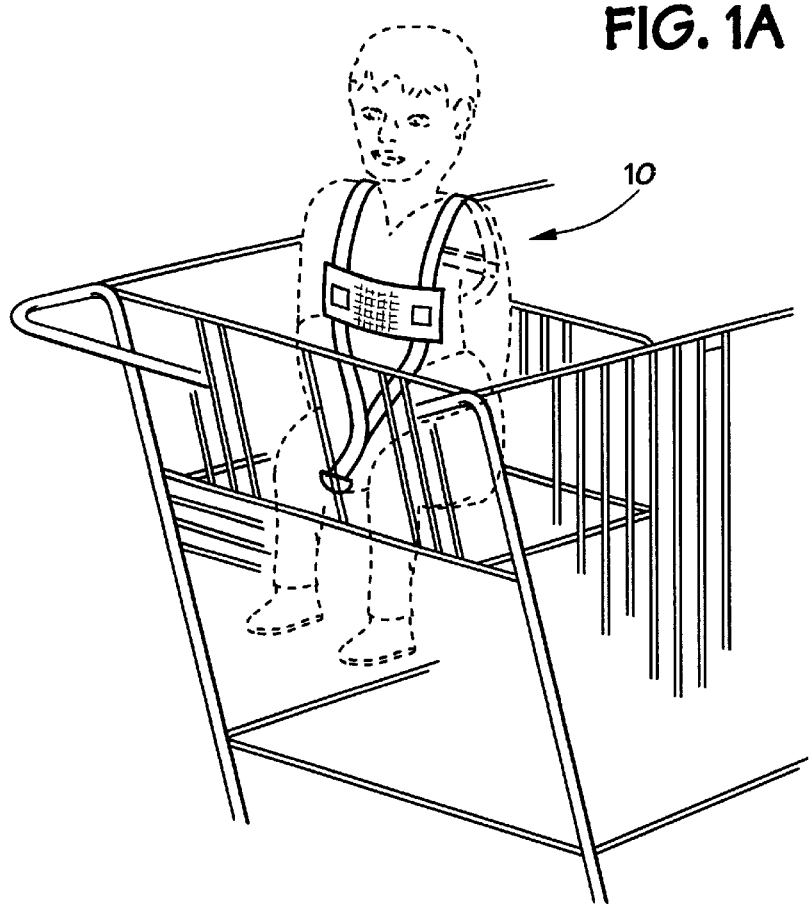
FIGS. 1A and 1B: Refer to a front view of a preferred embodiment of the child restraint apparatus.

This invention relates to a child safety restraint apparatus. As shown in FIG. 1A, the apparatus 10, when connected to a child transport, is designed to substantially restrain a child in a sitting position therein. Any child transport may be used, including vehicular seats, strollers, infant carriers, chairs, highchairs, motion toys, or shopping carts. The apparatus preferably is connected to a car seat or shopping cart, most preferably a shopping cart.

The apparatus 10 generally comprises a plurality of straps and fasteners positioned to adequately restrain a child in a sitting position. Some or all of the straps may be interconnected with other straps.

Figure 2:
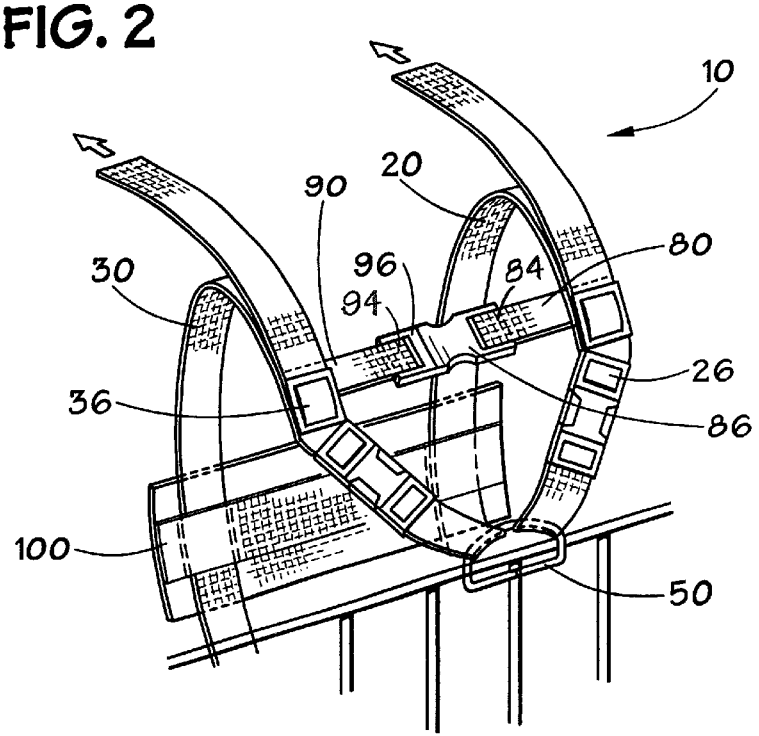
FIG. 2: Refers to a rear view of a preferred embodiment of the child restraint apparatus.
Figure 1B:
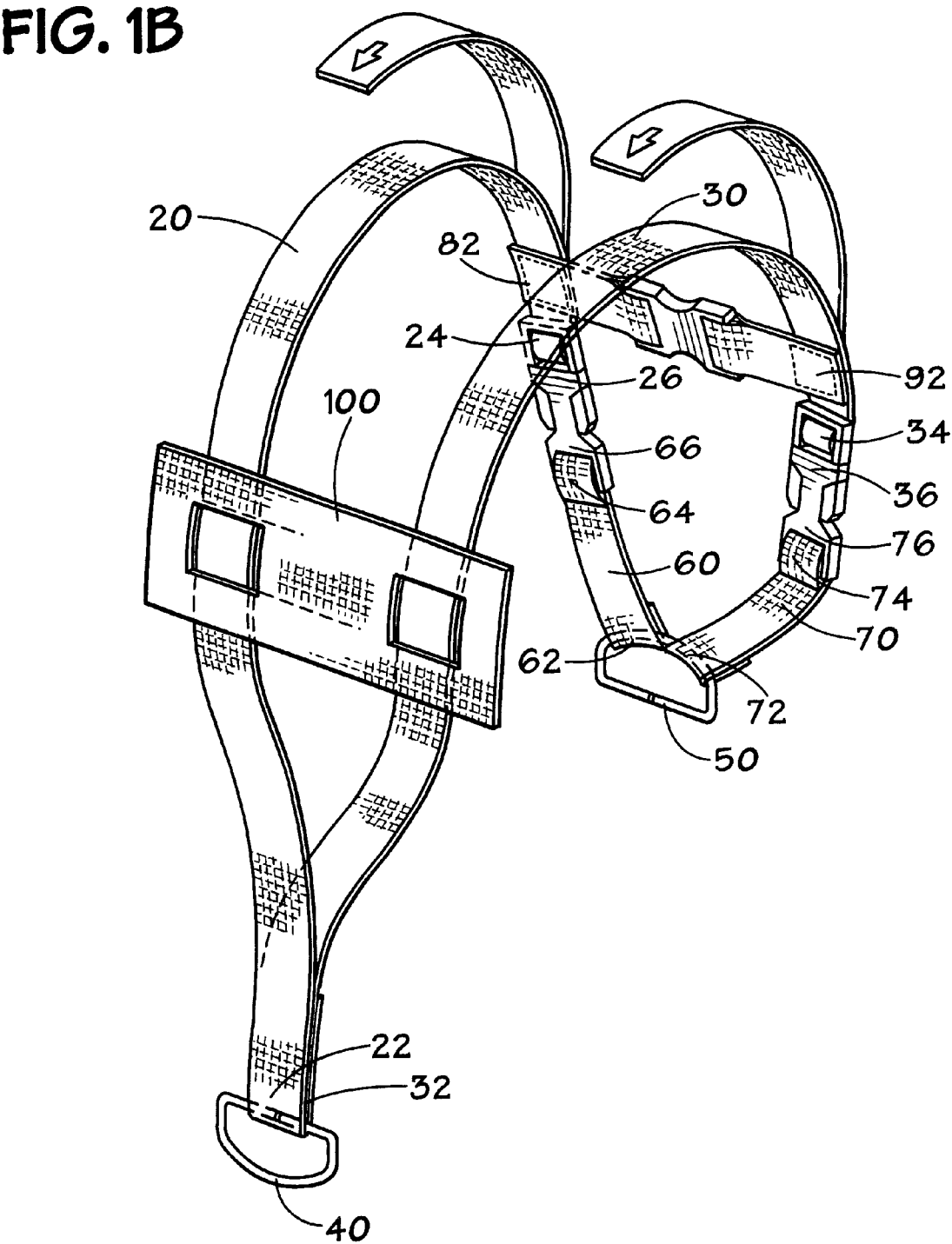

As shown in FIGS. 1B and 2, in a preferred embodiment, at least two straps 20 and 30 are positioned to pass over the shoulder or neck region of a child in a sitting position. Such an arrangement forms an over-the-shoulder harness. These shoulder straps may be further interconnected with additional straps. For example, transverse straps may be connected to each of the shoulder straps in a position that passes across the front or rear of a sitting child. The restraint apparatus preferably comprises a transverse strap across the chest and back of a sitting child.

Additional straps may be provided as needed to properly restrain a child sitting in a child transport. In a preferred embodiment, the apparatus comprises:

a first strap 20 having a first and second end 22, 24;
a second strap 30 having a first and second end 32, 34;
a first pivot 40 capable of being secured to a child transport between the upper legs of a child seated therein;
wherein:
the first end 22 of the first strap 20 and the first end 32 of the second strap 30 are securely connected to the first pivot 40; and
the second end 24 of the first strap 20 and the second end 34 of the second strap 30 are each adjustably connected to a fastener 26, 36;
a third strap 60 having a first and second end 62, 64;
a fourth strap 70 having a first and second end 72, 74;
a second pivot 50 capable of being secured to a child transport behind a child seated therein;
wherein:
the first end 62 of the third strap 60 and the first end 72 of the fourth strap 70 are securely connected to the second pivot 50;
the second end 64 of the third strap 60 and the second end 74 of the fourth strap 70 are each adjustably connected to a fastener 66, 76;
the adjustably connected fastener 66 on the third strap 60 is detachably connected with the adjustably connected fastener 26 on the first strap 20, such that the third strap 60 and the first strap pass 20 over the shoulder region of a child restrained therein; and
the adjustably connected fastener 76 on the fourth strap 70 is detachably connected with the adjustably connected fastener 36 on the second strap 30, such that the fourth strap 70 and the second strap 30 pass over the shoulder region of a child restrained therein;
a fifth strap 80 having a first and second end 82, 84;
a sixth strap 90 having a first and second end 92, 94;
wherein:
the first end 82 of the fifth strap 80 is fixably connected to the first strap 20 and the first end 92 of the sixth strap 90 is fixably connected to the second strap 30;
the second end 84 of the fifth strap 80 and the second end 94 of the sixth strap 90 are each adjustably connected to a fastener 86, 96;
the adjustably connected fastener 86 on the fifth strap 80 is detachably connected with the adjustably connected fastener 96 on the sixth strap 90; and
the fifth strap 80 and sixth strap 90, when connected to one another, are transversely positioned between the first strap 20 and the second strap 30, across the back of a child restrained therein;
a seventh strap 100 slidably connected to the first and second strap 20, 30;
wherein the seventh strap 100 is positioned transversely between the first and second straps 20, 30 across the chest region of an child restrained therein.

The straps may be made from any material that is safe for use around children. Such material may include, but is not limited to, nylon, cloth, elastic, plastic, and combinations thereof. The straps may be reinforced with additional material and stitching, as desired. In addition, padding may be provided on or in the straps. For example, greater comfort may be realized by slidably connecting foam pads along a portion of the straps. Alternatively, such padding may be incorporated directly into the material of the straps.

Any of the straps may be connected to fasteners. The number and location of the fasteners on the straps are designed to safely secure a child in the restraint apparatus; minimize a child's ability to defeat the restraint; and allow a caretaker to easily unfasten and retrieve a child when a restraint is no longer desired.

The fasteners may generally be of any form or type suitable for safe use around small children. For example, the fastener may be a snap-fit device, buckle, or clasp. The fastener is preferably a snap-fit device adapted to securely engage a second fastener. The mating fasteners may comprise a male/female mating pair.

The fasteners may be further designed to better ensure that each fastener is only connected with its proper mate. This may accomplished by uniquely marking the members of each mating pair of fasteners. For example, the members of each mating pair of fasteners may be uniquely colored. Thus, each fastener will be connected to its correct mate by connecting like colored fasteners together. Alternatively, fasteners may be marked in a like manner with symbols, letters, pictures, characters, or any other identifiable marking. Moreover, the markings may be designed as a part of the fastener. For example, raised symbols on the surface of the fastener may be employed. In an alternative embodiment, a fastener may be custom designed such that it is capable of mating with its correct mate, but not with the other fasteners. It may also be desirable to employ a combination of any of the above markings with the custom designed fasteners.

The fasteners may be adjustably or permanently connected to the straps. The fasteners are preferably adjustably connected to the straps. With a typical snap-fit fastener, the straps may be threaded through two or more openings at the base of the fastener. The strap length is adjusted by sliding portions of the strap into or out of the openings on the fastener. In this manner, the straps may be lengthened or shortened to accommodate larger or smaller children.

The fasteners may be made of any material suitable for use around children. Such materials may include, but are not limited to, plastic, metal, and cloth.

One or more of the straps may be permanently, semi-permanently, or detachably affixed to pivots. The pivots are designed to provide a secure connection between the plurality of straps and the child transport. The pivots may be permanently, semi-permanently, or detachably connected to a child transport. In a preferred embodiment, the straps are connected to at least two pivots. A first pivot is preferably attached to a child transport between the upper legs of a child seated therein. A second pivot is preferably attached to a child transport behind a child seated therein. Additional pivots may be provided to more securely restrain a child seated in the child transport. For example, pivots may be connected to a child transport so they are positioned to each side of a child seated therein.

The pivots may generally be made of any material suitable for use around children. The pivot is preferably made of metal, plastic, or cloth; more preferably metal; and most preferably stainless steel. The pivot is typically designed to securely fasten the straps to a child transport while allowing the straps to move about the pivot. In a preferred embodiment, the pivot is a metal ring.

All of the methods and apparatus disclosed and claimed herein can be made and executed without undue experimentation in light of the present disclosure. While the apparatus and method of this invention have been described in terms of preferred embodiments, it will be apparent to those of skill in the art that variations may be applied without departing from the concept, spirit and scope of the invention. All such similar substitutes and modifications apparent to those skilled in the art are deemed to be within the spirit, scope and concept of the invention.

What is claimed is:

1. A child safety apparatus adapted to substantially restrain a child, the child having upper legs, in a sitting position when connected to a child transport, comprising:
    a first strap having a first and second end;
    a second strap having a first and second end;
    a first pivot capable of being secured to a child transport between the upper legs of a child seated therein;
    wherein:
        the first end of the first strap and the first end of the second strap are securely connected to the first pivot; and
        the second end of the first strap and the second end of the second strap are each adjustably connected to a fastener;
    a third strap having a first and second end;
    a fourth strap having a first and second end;
    a second pivot capable of being secured to a child transport behind a child seated therein;
    wherein:
        the first end of the third strap and the first end of the fourth strap are securely connected to the second pivot;
        the second end of the third strap and the second end of the fourth strap are each adjustably connected to a fastener;
        the adjustably connected fastener on the third strap is detachably connected with the adjustably connected fastener on the first strap, such that the third strap and the first strap pass over the shoulder region of a child restrained therein; and
        the adjustably connected fastener on the fourth strap is detachably connected with the adjustably connected fastener on the second strap, such that the fourth strap and the second strap pass over the shoulder region of a child restrained therein;
    a fifth strap having a first and second end;
    a sixth strap having a first and second end;
    wherein:
        the first end of the fifth strap is fixably connected to the first strap and the first end of the sixth strap is fixably connected to the second strap;
        the second end of the fifth strap and the second end of the sixth strap are each adjustably connected to a fastener;
        the adjustably connected fastener on the fifth strap is detachably connected with the adjustably connected fastener on the sixth strap; and
        the fifth strap and sixth strap, when connected to one another, are transversely positioned between the first strap and the second strap, across the back of an child restrained therein;
    a seventh strap slidably connected to the first and second strap;
        wherein the seventh strap is positioned transversely between the first and second straps across the chest region of a child restrained therein.

2. The safety apparatus of claim 1, wherein each of the fasteners is a releasable snap-fit device adapted to engage a mating fastener.

3. The safety apparatus of claim 1, wherein each fastener and its fastener mate are identically marked to facilitate proper identification and engagement of a fastener pair.

4. The safety apparatus of claim 3, wherein the mark is a color.

5. The safety apparatus of claim 3, wherein the mark is a shape.

6. The safety apparatus of claim 1, wherein each fastener is custom fitted such that the fastener will engage only with its proper fastener mate.

7. The safety apparatus of claim 1, wherein the engagement of the fasteners is resistant to disengagement by a child.

8. The safety apparatus of claim 1, wherein at least the first and second pivots are connected to a child transport.

9. The safety apparatus of claim 1 wherein the first and second pivots each comprise a metallic ring.

10. The safety apparatus of claim 1 wherein said first and second straps converge into a single strap around the first pivot.

11. The safety apparatus of claim 1 wherein the straps comprise a flexible material.

12. The safety apparatus of claim 11 wherein the flexible material is cloth.

13. The safety apparatus of claim 12, wherein the flexible material further comprises elastic.

14. The safety apparatus of claim 12 wherein the flexible material is reinforced with additional material.

15. The safety apparatus of claim 12 wherein the flexible material is reinforced with stitching.

16. The safety apparatus of claim 11 wherein the flexible material is nylon.

17. The safety apparatus of claim 16, wherein the flexible material further comprises elastic.

18. The safety apparatus of claim 16 wherein the flexible material is reinforced with additional material.

19. The safety apparatus of claim 16 wherein the flexible material is reinforced with stitching.

20. The safety apparatus of claim 11 wherein the flexible material is a combination of cloth and nylon.

21. The safety apparatus of claim 20 wherein the flexible material is reinforced with stitching.

22. The safety apparatus of claim 20 wherein the flexible material is reinforced with additional material.

23. The safety apparatus of claim 20, wherein the flexible material further comprises elastic.

24. The safety apparatus of claim 1, wherein the child transport is a shopping cart, vehicular seat, stroller, motion toy, highchair, or booster seat.

25. The safety apparatus of claim 1, wherein the child transport is a shopping cart.

* * * * *